United States Patent
Ashford et al.

(10) Patent No.: US 7,797,128 B2
(45) Date of Patent: Sep. 14, 2010

(54) CALIBRATION PROCEDURE FOR RIVET HEIGHT GAGES

(75) Inventors: Curtis M. Ashford, St. Peters, MO (US); Robert A. Bost, St. Louis, MO (US); William J. Klunk, Jerseyville, IL (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 11/951,757

(22) Filed: Dec. 6, 2007

(65) Prior Publication Data

US 2009/0150109 A1 Jun. 11, 2009

(51) Int. Cl.
*G01B 5/18* (2006.01)
*G01B 7/26* (2006.01)
*G01B 11/22* (2006.01)
*G01B 13/14* (2006.01)
*G01B 21/18* (2006.01)

(52) U.S. Cl. ...................................... 702/166

(58) Field of Classification Search ............. 702/33–35, 702/85, 97, 105, 155, 157, 158, 166; 33/545, 33/702; 73/1.79, 1.81, 865.8, 865.9
See application file for complete search history.

(56) References Cited

U.S. PATENT DOCUMENTS

| 5,622,211 | A  | * | 4/1997 | Martin et al. ............... 138/177 |
| 5,727,300 | A  | * | 3/1998 | Ekdahl et al. ............ 29/407.04 |
| 7,155,958 | B2 |   | 1/2007 | Ashford |
| 2006/0096351 | A1 | * | 5/2006 | Ashford ......................... 73/7 |

* cited by examiner

*Primary Examiner*—Michael P Nghiem
(74) *Attorney, Agent, or Firm*—Yee & Associates, P.C.; Dennis R. Plank

(57) ABSTRACT

A method, apparatus, and computer usable program product for calibrating rivet height gages. In one embodiment, the process calculates a size of sphere required to create a sphere-based ring gage to simulate a contact point between a rivet height gage and a sharp edge of a specified sharp-edged ring gage. The process identifies an expected protrusion height from a top of the rivet height gage to a reference surface formed by tops of a set of spheres of the size of sphere required to simulate the contact point.

19 Claims, 7 Drawing Sheets

CALIBRATION PROCEDURE FOR RIVET HEIGHT GAGES

BACKGROUND INFORMATION

1. Field

The present disclosure is related generally to a data processing system and in particular to a method and apparatus for rivet height gages. More particularly, the present disclosure is directed to a computer implemented method, apparatus, and computer usable program code for calibrating rivet height gages.

2. Background

Fasteners on commercial and military aircraft carry loads from one component of the aircraft to the next. A rivet is a commonly used mechanical fastener. At installation, a rivet is placed in a pre-drilled hole that may or may not be countersunk. The size and angle of the countersink should correspond to a particular countersunk rivet.

A countersunk rivet is a rivet having a conical shaped head with a substantially flat outer face and tapering inner face allowing the countersunk rivet to engage the countersink in the material. Typically, the installed outer face of the rivet sits substantially flush with the surrounding material.

If a countersink for the rivet is the wrong size, shape, or is misaligned relative to the rivet hole or surrounding material, the rivet may be difficult to install in the hole, may fit up improperly, or may be preloaded in a non-optimal manner. These conditions may be undesirable. In such cases, the head of the fastener may protrude above the surrounding surface further than desired, sit at an incorrect angle, or sit too low in the countersink. At aircraft speed, these protruding, misaligned, or too deep fastener heads may be undesirable.

Rivet height gages are distinct or specialized countersunk rivets manufactured to exacting tolerances. Rivet height gages are placed in countersinks and used to determine the location of a rivet head relative to the surrounding surface and/or the countersink.

In other words, rivet height gages are used to verify that rivet countersinks are drilled to a proper depth, angle, and/or size so the top of a particular countersunk rivet head will be substantially flush with the surface of the material being riveted when the rivet is inserted in the rivet hole. Consequently, rivet height gages may also be used to verify more accurate depths of rivets and fasteners through a material. Rivet height gages are used in the manufacture, construction, repair, and maintenance of a number of manufactured items, including, without limitation, aircraft and aerospace vehicles.

Rivet height gages are periodically calibrated to ensure that the device is correctly measuring the countersinks. Currently, rivet height gages are calibrated using rivet calibration gages having sharp edges, such as, without limitation, sharp edged ring gages and chamfer gages. The sharp edges on these rivet calibration gages may be subject to wear, smoothing, and rounding at the edges of the ring gage. This rounding or wearing of the sharp edge is referred to as "roll-off." A rivet height gage calibrated using a rivet calibration gage with roll-off may protrude from the rivet calibration gage to a height that is less than it would protrude in the absence of the roll-off. As a result, every rivet of the size calibrated using a rivet calibration gage with roll-off, also called a worn ring gage, may protrude above the material further than expected and desired.

Moreover, the roll-off, also known as round-off, of the sharp edge on currently available rivet calibration gages may preclude a better rivet gage calibration. Currently, maintenance personnel can attempt to counteract the roll-off by using an abrasive to shape the calibration gage top surface in order to provide a slightly sharper edge. However, roll-off removal may be difficult and time consuming. Moreover, sharp-edges may frequently not be sharp enough even when the ring gage is new. Therefore, current solutions may be insufficient to counter the effects of roll-off.

The tolerance requirements for rivet height gages necessitate a better, more accurate rivet height gage calibration. Accordingly, there is a need for a method and apparatus for minimizing or eliminating the effects of roll-off in rivet height gage calibration, which overcomes the problems discussed above. Embodiments of the disclosure are intended to satisfy this need.

SUMMARY

An embodiment of the present disclosure provides a method, apparatus, and computer usable program product for calibrating rivet height gages. The advantageous embodiments provide a method for measuring protrusion heights of rivet height gages. The process calculates a size of sphere required to simulate a contact point between a rivet height gage and a sharp edge of a specified sharp-edged ring gage. The process identifies an expected protrusion height from the top of the rivet height gage to a reference surface formed by the tops of a set of spheres of the size of sphere required to simulate the contact point.

In another advantageous embodiment, a computer program product for measuring protrusion heights of rivet gages is provided. The computer program product comprises a computer readable medium and program code stored on the computer readable medium for calculating a size of sphere required to simulate a contact point between a rivet height gage and a sharp edge of a specified sharp-edged ring gage. The computer program product also includes program code stored on the computer readable medium for identifying an expected protrusion height from the top of the rivet height gage to a reference surface formed by the tops of a set of spheres of the size of sphere required to simulate the contact point.

In yet another illustrative embodiment, a sphere-based ring gage is provided. The sphere-based ring gage comprises a ring gage and insert with a contact force characterized as a slip fit having an inside diameter that defines a hole large enough for the shank of a rivet height gage to fit inside the hole. A set of spheres are included. The top of the set of spheres forms a reference surface. Each sphere in the set of spheres is a size that simulates a contact point between the rivet height gage and a sharp edge. In one embodiment, the set of spheres comprises three spheres having a same diameter.

In yet another advantageous embodiment, a method is provided for calibrating rivet height gages using a sphere-based ring gage. A size of sphere required to create a sphere-based ring gage to simulate a contact point between a rivet height gage and a sharp edge of a specified sharp-edged ring gage is calculated to form a calculated size of sphere. A set of spheres is selected. Each sphere in the set of spheres is the calculated size of sphere. The set of spheres is placed approximately an equal distance apart. A zero reference on top of the set of spheres is created to form the reference surface of the sphere-based ring gage.

An inside diameter of an insert, an outside diameter of the insert, and a height of the insert is identified. A shank of the rivet height gage fits inside a hole defined by the inside diameter. The outside diameter of the insert fits inside the sphere-based ring gage. The height of the insert is less than a height of the sphere-based ring gage. The insert is inserted inside the sphere-based ring gage. The set of spheres sits on top of the insert. The tops of the spheres protrude above the height of the sphere-based ring gage. A shank of a rivet height gage is placed inside the hole defined by the inside diameter of the insert.

An actual protrusion height from a top of the rivet height gage to the reference surface formed by tops of a set of spheres of the size of sphere required to simulate the contact point. An expected protrusion height from the top of the rivet height gage to the reference surface is identified. The expected protrusion height is compared to an actual protrusion height to determine if the rivet height gage is within tolerance.

In another advantageous embodiment, a sphere-based ring gage for calibrating rivet height gages is provided. In this embodiment, the sphere-based ring gage includes a ring gage having an inside diameter. The inside diameter defines a hole. An insert fits inside the hole. The insert has an inside diameter, an outside diameter, and a height. A shank of a rivet height gage fits inside a hole defined by the inside diameter. The outside diameter of the insert fits inside the ring gage. The height of the insert is less than a height of the ring gage.

A set of spheres sits on top of the insert. The set of spheres comprises three spheres. Each sphere in the set of three spheres has a same diameter. A top of the set of spheres forms a reference surface. Each sphere in the set of spheres is a size that simulates a contact point between the rivet height gage and a sharp edge.

A rivet height gage fits inside a hole defined by the inside diameter of the insert. A top of the rivet height gage protrudes above the reference surface formed by tops of the set of spheres to form an actual protrusion height. The actual protrusion height is compared to an expected protrusion height from the top of the rivet height gage to a reference surface formed by tops of a set of spheres to determine if the rivet height gage is within tolerance.

Thus, the advantageous embodiments provide a method and a sphere-based ring gage for calibrating rivet height gages while minimizing or eliminating the effects of roll-off and permitting a more accurate calibration of rivet height gages. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
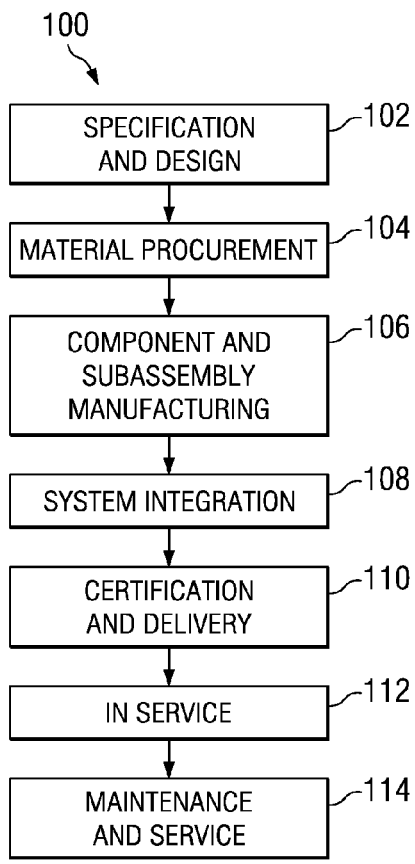
FIG. 1 is an illustration of an aircraft manufacturing and service method in accordance with an advantageous embodiment.
Figure 2:
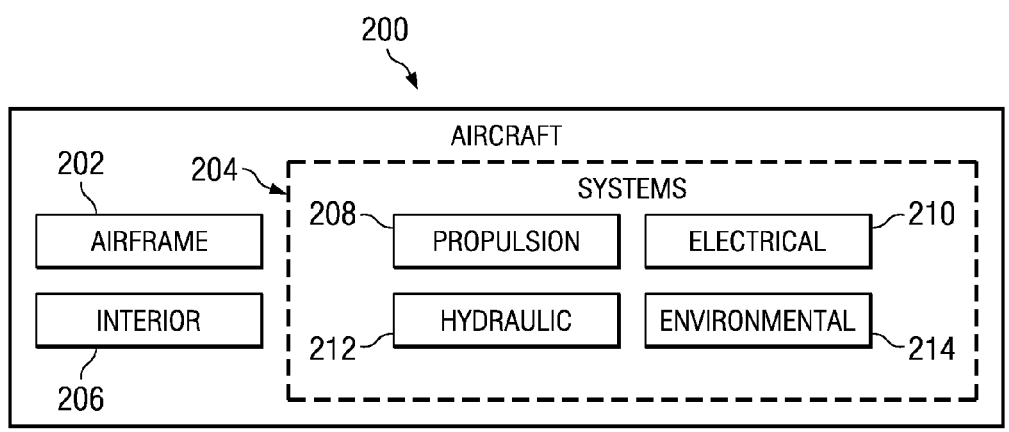
FIG. 2 is an illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1. Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

Figure 3:
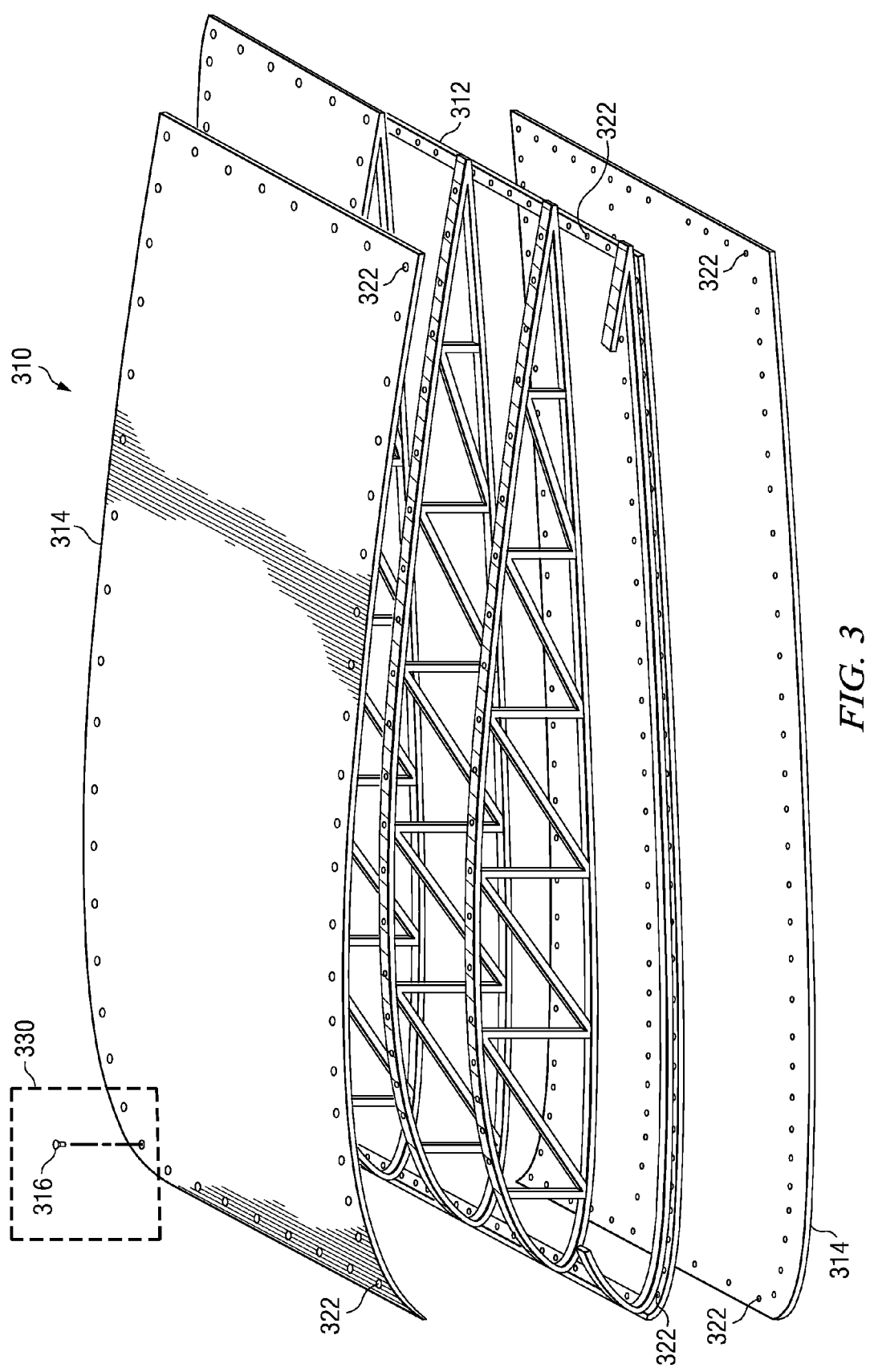
FIG. 3 is an illustration of an aircraft wing constructed in accordance with an advantageous embodiment.

With reference now to FIG. 3, an illustration of an aircraft wing constructed in accordance with an advantageous embodiment is shown. The wing shown in FIG. 3 comprises a structure 312, several skin panels 314 with chamfered holes, at least one fastener 316, and numerous fastener holes 322. In this example, fasteners 316 are rivets. Skin panels 314 fit over structure 312 so that the corresponding fastener holes 322 align to allow fasteners, such as fastener 316, to be installed in holes 322. In the alternative, holes 322 can be drilled with panels 314 clamped in their final assembly locations on the structure 312 to ensure hole 322 alignments. Structure 312 reacts some of the load on an aircraft 300 which is supported by aerodynamic forces reacting on the panels 314 by air moving past the wing 310.

Fasteners on commercial and military aircraft carry crucial loads from one component of the aircraft to the next. If a rivet hole for the fastener is too small, the fastener may be difficult to install in the hole, may fit up improperly, or be preloaded in a non-optimal manner. These conditions are undesirable. In addition, the head of the fastener might protrude above the surface of the joint further than desired. At high aircraft speed, these properties are undesirable.

As used herein, the term protrude refers to a positive protrusion of the top of the rivet above the surface of the material or a negative protrusion of the top of the rivet below the surface of the material. In other words, the protrusion distance from the surface of the material to the top of the rivet head either above the surface of the material or below the surface of the material.

Rivet height gages are rivets manufactured to exacting tolerances. Rivet height gages are used to determine how far above the surface of a material the head of a rivet of a given size should protrude if the rivet is inserted into a hole and countersink of appropriate size. In other words, rivet height gages are used to verify that rivet holes and rivet countersinks are drilled to a proper depth so the top of a particular rivet head will be substantially flush with the aircraft skin. Rivet height gages are also used to verify more accurate depths of rivets and fasteners through a material. Rivet height gages are used in the manufacture, construction, repair, and maintenance of a number of manufactured items, including, without limitation, aircraft and aerospace vehicles to ensure that appropriate sized rivets are used in a given rivet hole.

Figure 4:
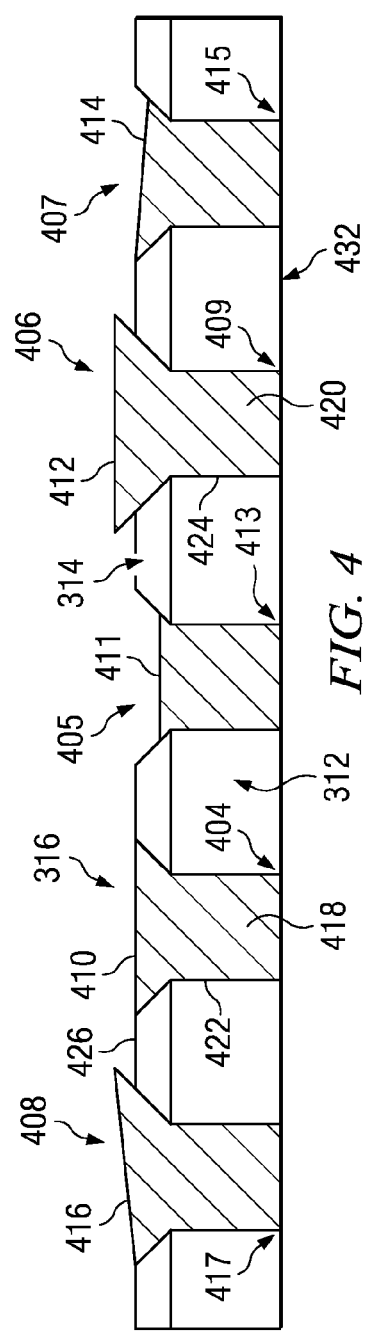
FIG. 4 is an illustration of rivets in a structure.

FIG. 4 is an illustration of rivets in a structure. The structure shown in FIG. 4 is portion 330 of skin panel 314 fastened to structure 312 in FIG. 3 with rivets, such as rivet 316 in hole 404. In FIG. 4, one advantageous installation of a rivet is shown and four non-advantageous installations of rivets are shown.

Rivets 316, 405, 406, 407, and 408 are flat-head countersunk rivets. However, rivets 316 and 405-408 may be implemented as any type of known or available rivets, including, without limitation, a crown-head rivet, round head rivet, flat head rivet, trussed rivet, or any other appropriate type of rivet. Rivets 316, and 405-408 may be composed of steel, stainless steel, aluminum, brass, copper, nickel, iron, an alloy, or any other suitable material. In this example, rivets 316, and 405-408 are countersunk rivets. Rivets 316 and 405-408 may be used because of the relative versatility of rivets in joining components of different materials and their ease and low cost of installation.

Rivet height gages are specialized rivets manufactured to exacting tolerances. Rivet height gages are used to determine how far above the surface of a material the head of a rivet of a given size should protrude if the rivet is inserted into a countersunk hole of appropriate size. The height or distance that a rivet head will protrude above or below a surface of a material when the rivet is inserted into a particular hole or countersink is referred to as the protrusion height.

As used herein, the term protrusion height may refer to a positive protrusion height from the top of a rivet to a reference surface or a negative protrusion height. A positive protrusion height is a height or distance from a reference surface to the top of a rivet that protrudes above the reference surface. A negative protrusion height is a distance from the reference surface down to the top of a rivet head that sinks below the reference surface. In other words, if a rivet sinks too far into a countersink hole, the rivet will have a negative protrusion height from the top of the rivet to the reference surface. If the rivet sticks out above the reference surface, the rivet will have a positive protrusion height from the reference surface to the top of the rivet that is protruding above the reference surface. A protrusion height of zero indicates a rivet that is sitting substantially flush with the reference surface.

FIG. 4 shows manufactured head 410 and grip or shank 418 of rivet 316, wall 422 of hole 404, outer surface 426 of the structure 312, and inner surface 432 of structure 312. In this example, head 410 of rivet 316 is sitting substantially flush with outer surface 426 of structure 312. Rivet 316 has no protrusion height or has a protrusion height within tolerance. In other words, hole 404 is a straight hole having a substantially correct countersink for rivet 316. Rivet head 410 of rivet 316 is substantially flush with the surrounding surface.

Rivet 405 sits in hole 413. Head 411 of rivet 405 sits below outer surface 426 of structure 312. Rivet 405 may sit below outer surface 426 because hole 413 may be too big or hole 413 may be a wrong size for rivet 413. This condition may also occur, for example and without limitation, if the countersink is too deep, the countersink is too far below the surface, or the angle of the countersink is too wide. Therefore, rivet 405 has a negative protrusion height.

FIG. 4 also shows head 412 of rivet 406, shank 420 of rivet 406, and wall 424 of hole 409. Rivet head 412 protruding above the surrounding outer surface 426. Head 412 may protrude above the surrounding outer surface 426 because hole 409 may be too small for rivet 406 or hole 409 may be an incorrect size for rivet 409. This condition may also result, for example, and without limitation, if the countersink is too high, the countersink is too shallow, or the countersink angle is incorrect. For example, the countersink angle may be ninety degrees instead of one-hundred and ten degrees. Thus, in this example, rivet 406 has a positive protrusion height above outer surface 426 of the structure 312.

Head 414 of rivet 407 in hole 415 is angled so that a portion of head 414 is below surrounding outer surface 426 and another portion of head 414 is substantially flush with outer portion 426. In this example, a portion of head 414 may be too far below the surrounding outer surface 426 while another portion of head 414 is substantially flush with outer surface 426 or a portion of head 414 may protrude above the surrounding outer surface 426 while another portion of head 414 sits too far below surrounding outer surface 426. This condition may occur if the countersink and/or rivet hole 415 is angled relative to surrounding outer surface 426. In this case, rivet 407 may have a negative protrusion height.

Head 416 of rivet 408 in hole 417 is angled so that a portion of head 416 protrudes above surrounding outer surface 426 and a portion of head 416 is substantially flush with surrounding outer surface 426. In this example, a portion of head 414 may be too high above outer surface 426 while another portion of head 414 is substantially flush with outer surface 426 or a portion of head 414 may protrude too far above the surrounding outer surface 426 while another portion of head 414 sits too far below the surrounding outer surface 426. This condition may occur if hole 417 and/or the countersink is angled relative to the surrounding outer surface 426 of structure 314.

Rivet height gages are used to measure countersunk rivet holes to ensure substantial flushness of rivets with outer surface 426 and accurate depth of countersunk rivet holes through structure 312. Rivet height gages are used in the manufacture, construction, repair, and maintenance of a number of manufactured items, including, without limitation, aircraft and aerospace vehicles. If the rivet height gage accurately measures the height or depth of countersunk holes 404, 409, 413, 415, and 417 when rivets 316, and 405-408 are inserted in holes 404, 409, 413, 415, and 417 manufactured head 410, 411, 412, 414, and 416 of each of rivets 316, and 405-408 nominally rests flush against outer surface 426 of structure 312.

Rivet height gages are periodically calibrated to ensure that the device is correctly measuring the height or depth of rivet holes. Currently, rivet height gages are calibrated using rivet calibration gages having a pre-determined hole diameter defined by sharp edges, such as, without limitation, sharp edged ring gages and chamfered ring gages.

The sharp edges on these gages may be subject to wear and rounding at the edges of the ring gage. This rounding or wearing of the sharp edge is referred to as "roll-off." This roll-off results in an incorrect hole diameter. In other words, the roll-off may create a rounding effect that may make the diameter of the ring gage hole wider than it should be. A rivet height gage calibrated using a sharp-edged ring gage with roll-off will protrude from the sharp-edged ring gage to a height that may be less than it would protrude in the absence of the roll-off. As a result, every rivet of the size calibrated using the worn ring gage will protrude above the surface of structure 312 further than expected and desired.

In this example, rivets 316, and 405-408 are selected using a rivet height gage that was calibrated by a sharp-edged ring gage with roll-off or rounding of the sharp edge. Thus, the rivet height gage may not have been correctly calibrated due to the roll-off on the sharp-edged ring gage.

Nominally, after the heights of rivets 316, and 405-408 are measured using the rivet height gage, rivets 316 and 405-408 are selected so that the grip of each rivet, such as grip 418 and 420 of rivets 316 and 406 will substantially fill the hole for each rivet when each rivet is inserted in the appropriate hole. If the rivet height gage was accurately calibrated, head 410, 411, 412, 414, and 416 of rivets 316 and 405-408 will be substantially flush with outer surface 426 of structure 312 when each rivet is placed in an appropriate rivet hole, such as hole 404, 409, 413, 415, and 417.

In this example, rivets 404-408 are rivets of an incorrect size due to inaccuracies in a rivet height gage used. Thus, when rivets 404-408 are placed in holes 409, 413, 415, and 416, rivets 404-408 are not substantially flush with the surrounding outer surface 426. For example, when rivet 406 is popped into place in countersunk hole 409, head 406 protrudes above outer surface 426 of structure 312 rather than being flush with outer surface 426 because the rivet selected in this example may be an incorrect size. Rivet 316 is what a properly installed rivet looks like when an accurately calibrated rivet height gage is used to select the rivet.

In this example, an inaccuracy occurred in the measurement of the height of rivet 406 above a surface 426 due to inaccuracies or roll-off in a sharp-edged ring gage used to calibrate the rivet height gage. The rivet height gage used to check the countersinks may then produce an incorrect result. This inaccuracy in checking the countersink may then result in an incorrect sized rivet being selected for a countersunk hole or fail to detect an improperly sized, shaped, or aligned rivet and/or countersink hole, such as hole 409. Thus, in this example, rivet 406 protrudes too far above outer surface 426 of structure 312. Thus, for rivets 404-408 extra effort may be expended to correct the size and/or angle of the countersink and/or install new rivets of appropriate size for the hole or countersink. These steps may be necessary to ensure the rivets sit substantially flush and/or within tolerances with outer surface 426 or the rivet has a correct protrusion height when inserted in a countersunk hole. In addition, the selection of the new rivet may still depend on the inaccurately calibrated rivet height gage. Therefore, it is possible that several repetitions of the riveting procedure may be necessary before installation of an appropriate rivet forms an optimized joint between panel 314 and structure 312.

To solve these problems, and others, the present disclosure provides methods and apparatus to ensure that rivet height gages are calibrated more accurately so that a protrusion of a top of a rivet height gage above a surface is more accurately measured. While the current embodiment depicts a riveted wing 310, any fastened assembly can be constructed in accordance with the principles of the embodiments.

The protrusion height above a reference surface is the specified parameter for rivet height gages. In other words, rivet height gages are used to determine how far above a reference surface a rivet of a given height will protrude when the rivet is inserted into a given rivet hole. Rivet height gages require calibrating of the height of the top surface of the rivet height gage above a specified position on the bottom, conical sharp-edged rivet gage surface. The calibrated rivet height gage can then be used to identify an appropriate size rivet for a given hole in a structure.

Figure 5:
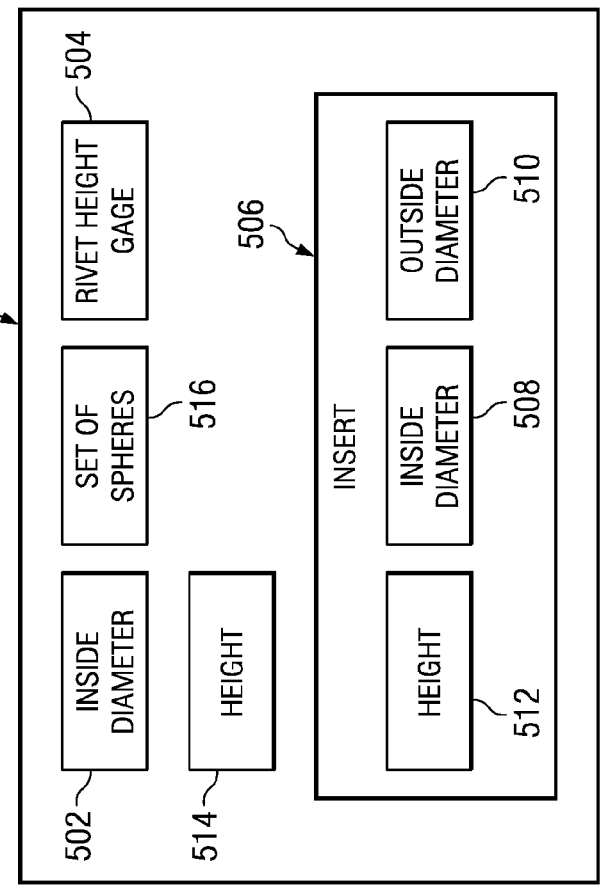
FIG. 5 is an illustration of a sphere-based ring gage for calibrating rivet height gages in accordance with an advantageous embodiment.

FIG. 5 is an illustration of a sphere-based ring gage for calibrating rivet height gages in accordance with an advantageous embodiment. Sphere-based ring gage is a ring gage for calibrating rivet height gages without requiring the presence of a sharp edge on the ring gage. Sphere-based ring gage 500 calibrates a rivet height gage (not shown). The rivet height gage calibrated using sphere-based ring gage may then be used to accurately gage the size of rivet required for a given rivet hole such that the rivet will not protrude above the surface of the structure further than required.

Sphere-based ring gage 500 has inside diameter 502. Inside diameter 502 defines a hole that is large enough for a shank of rivet height gage 504 to fit inside. In other words, the inside diameter 502 may vary depending on the size of the shank of rivet height gage 504. In this embodiment, inside diameter 502 is large enough for insert 506 to fit inside the hole defined by inside diameter 502. In other words, inside diameter 502 is a diameter size that permits insert 506 of a particular size to slip-fit inside a hole defined by inside diameter 502 of sphere-based ring gage 500.

Insert 506 has inside diameter 508 defining a hole inside insert 506. The shank of rivet height gage 504 fits inside the hole defined by inside diameter 508. Outside diameter 510 fits inside the hole defined by inside diameter 502 of sphere-based ring gage 500. Height 512 of insert is a height that is less than height 514 of sphere-based ring gage 500.

Thus, in this example, the shank of rivet height gage 504 fits inside a hole defined by inside diameter 508 of insert 506. Insert 506 slip-fits inside the hole defined by inside diameter 502 of sphere-based ring gage 500. Height 512 of insert 506 is less than height 514 of sphere-based ring gage 500, so insert 506 does not protrude above the top of sphere-based ring gage 500.

Set of spheres 516 is a set of three or more spheres. In this example, set of spheres 516 is a set of three spheres of equal diameter. The spheres may be constructed of metal, plastic, wood, or any other suitable material. Metal includes, without limitation, steel, stainless steel, aluminum, copper, nickel, brass, alloys, or any other suitable metal. In one embodiment, the spheres are spaced an equal distance apart from one another.

In this embodiment, the spheres sit on top of insert 506. However, in an absence of insert 506, the spheres may also sit in direct contact with the shank of the sphere-based calibration gage.

A top of the spheres in set of spheres 516 forms a reference surface. Each sphere in set of spheres 516 is a size that simulates a contact point between rivet height gage 504 and a sharp edge, where sphere-based ring gage 500 does not actually have a sharp-edge.

As discussed above, current methods for calibrating rivet height gages utilize sharp-edged ring gages and linear measurement devices to establish the protrusion height "h" of the rivet height gage above the reference surface on the sharp-edged ring gage.

Figure 6:
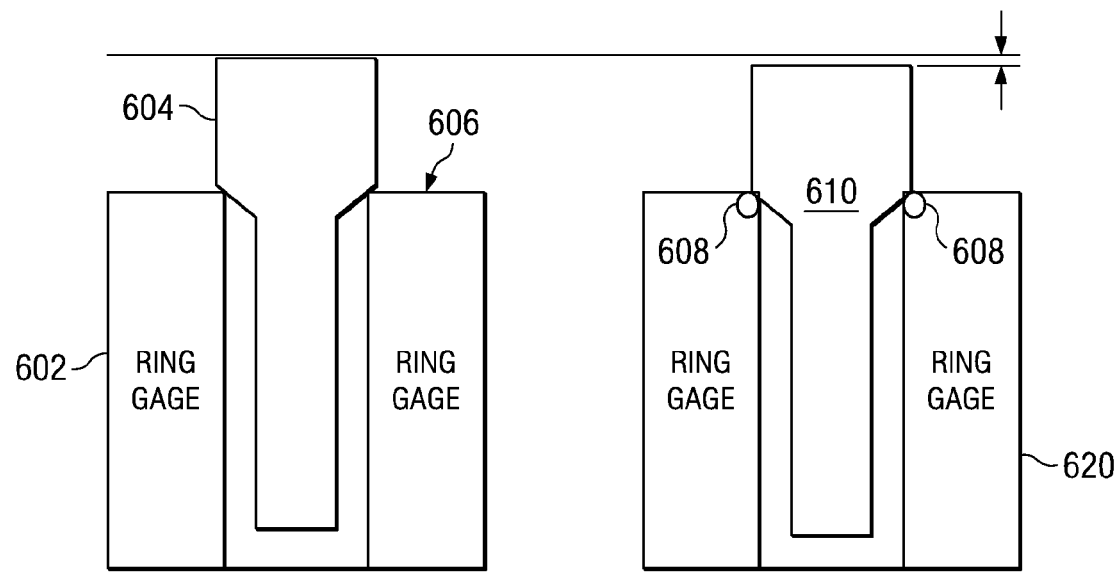
FIG. 6 is an illustration of a prior art ring gage.

FIG. 6 is an illustration of a prior art sharp-edged ring gage. FIG. 6 is a cross-section of sharp-edged ring gage 602. Rivet height gage 604 sits inside sharp-edged ring gage 602. Sharp-edged ring gage 602 must provide an accurate measurement of the height "h" of rivet height gage above reference surface 606 that is within a particular tolerance level. A linear measurement device (not shown) is used to establish the protrusion height "h" above reference surface 606 of sharp-edged ring gage.

However, the sharp-edged ring gage is not really sharp, even when the sharp-edged ring gage is new and/or has not been subjected to extensive utilization. In addition, as the sharp-edged ring gage is used, the sharp-edges may suffer from roll-off, which rounds or dulls the sharp edges. As a result, the sharp edge of the ring gage may become more of a shoulder than an edge. Thus, there may be a built in error in the process of calibrating rivet height gages that can take up a significant portion of the allowable protrusion height tolerance.

In this example, the edges of sharp-edged ring gage 602 are not sharp. The dulled edges form roll-off 608 which is a rounded shoulder rather than a sharp edge. In other words, the diameter of the ring may be incorrect at the intersection of the sharp-edged ring and the rivet height gage. The deviation from the specified diameter, nominally established by the sharp-edged form of the ring gage, may adversely impact height measurements. The rounding is illustrated by the arc of the circle at roll-off 608.

Roll-off 608 allows rivet height gage 610 to settle within ring gage 602 at a depth that is slightly lower than the depth of rivet height gage 604 in ring gage 602. As a result, the protrusion of rivet height gage 610 above the surface of ring gage 620 may be less than the protrusion of the rivet gage in a hole on a surface of a work piece to be riveted. Thus, rivets of the same size as the rivet height gage may protrude further than expected from the surface of a work piece in which the rivets are installed.

In another example, deviation from the specified diameter of the ring may also result in the rivet sitting too deeply in a hole on the work piece. These rivets that either protrude too far above a surface of the work piece or sit too deeply below the surface which is undesirable.

Moreover, the accuracy requirements and small size of these calibration gages for calibrating rivet height gages limit the equipment and procedures that can be employed to improve calibration of the rivet height gages.

Thus, the illustrative embodiments provide a method, apparatus, and computer usable program code for measuring protrusion heights of rivet gages. The protrusion height of a rivet height gage is the height difference between the top of a rivet height gage and a reference surface. The specified height of a rivet is contingent on the rivet gage being placed in a hole of a specified size. Therefore, the illustrative embodiments provide a sphere-based ring gage to eliminate the requirement for a sharp-edged ring gage that has a high potential to wear beyond the allowable limit. The sphere-based ring gage consists of a set of spheres, a ring gage without requirement for a sharp edge, an insert that slip fits inside the ring, and a linear transducer. A linear measurement device is used to establish the shank diameter of the rivet height gage and the thickness of an optical parallel may be used to establish the zero position at the tops of the spheres. The set of spheres consists of three or more spheres.

In one embodiment, the process calculates a size of sphere required to simulate a contact point between a rivet height gage and a sharp edge of a specified sharp-edged ring gage. The process identifies an expected protrusion height from a top of the rivet height gage to a reference surface formed by tops of a set of spheres of the size of sphere required to simulate the contact point.

Figure 7:
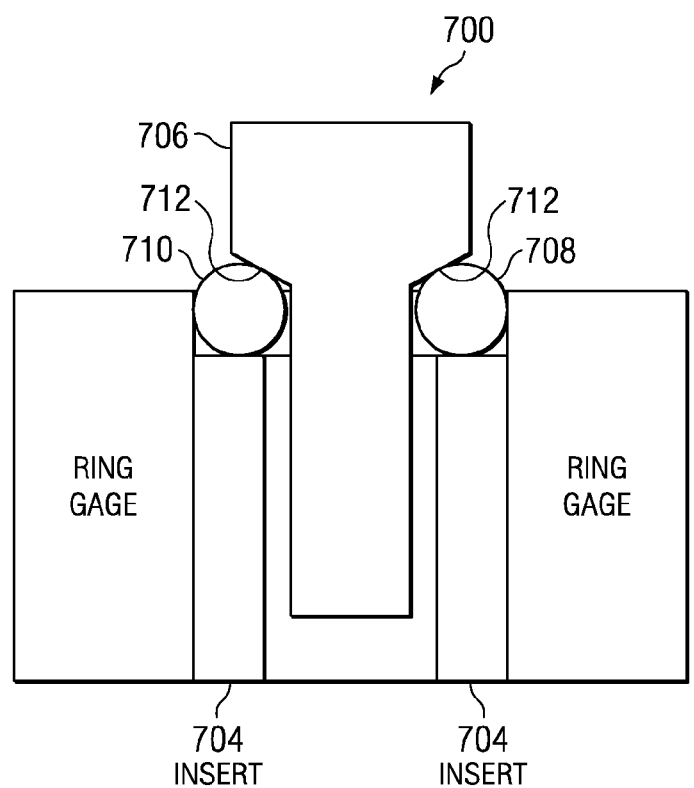
FIG. 7 is an illustration of a cross-section of a sphere-based gage for calibrating rivet height gages in accordance with an advantageous embodiment.

FIG. 7 is an illustration of a cross-section of a sphere-based ring gage for calibrating rivet height gages in accordance with an advantageous embodiment. Sphere-based ring gage 700 is a gage for measuring the protrusion height of a rivet height gage, such as rivet height gage 604 in FIG. 6.

Sphere-based ring gage 700 includes an insert 704. A set of spheres sit on top of an upper surface of insert 704. In this example, insert 704 is a sleeve that slip fits inside sphere-based ring gage 700. Rivet height gage 706 rests in contact with set of spheres. The shank of rivet height gage protrudes downward into insert 704.

In this example, the set of spheres is a set of three spheres of equal size and equal diameter. Because FIG. 7 is a cross-section, only two of the three spheres in the set of spheres, spheres 708 and 710, are visible in FIG. 7. Although all three spheres are not shown in FIG. 7, in this embodiment, the three spheres are approximately equidistantly spaced from each other. However, the spheres are not required to be precisely equidistant from each other in order to utilize this embodiment to obtain a protrusion height of a rivet height gage.

Thus, to create sphere-based ring gage 700, a ring diameter for the hole in ring gage is determined. The diameter should be sufficient to permit the shank of rivet height gage 706 to fit inside the hole. A sphere diameter is identified for the spheres in the set of spheres. The sphere diameter should be sufficient to simulate a contact point 712 between rivet height gage 706 and an edge of a sharp-edged ring gage to form reference surface.

Insert 704 has a height, inside diameter, and outside diameter such that insert is slip-fitted within sphere-based ring gage. The inside diameter is sufficient to permit rivet height gage to sit inside an opening formed by the inside diameter of spheres 708 and 710 and/or the inside diameter of insert 704, as shown in FIG. 7.

The set of spheres are placed on top of insert 704. The spheres are approximately placed an equal distance from each other. The spheres may be placed on top of insert 704 using tweezers to position them such that they are roughly equally spaced. A digital indicator may be used to establish a zero reference on top of the spheres. Rivet height gage 706 is inserted inside the assembled sphere-based ring gage 700 to calibrate rivet height gage 706.

A digital indicator may be used to measure the actual protrusion height to the top of rivet height gage 706 from reference surface 712 formed by the top of the set of spheres and the contact point of the spheres with rivet height gage 706. The actual measurement is compared to an expected or calculated protrusion height to determine a size of drilled hole and/or a countersink size in a work piece appropriate for rivet height gage 706. In other words, the actual protrusion height is compared to the expected protrusion height to verify that the amount of protrusion is within the limits established for rivet height gage 706. Once calibrated, rivet height gage 706 may be used to identify a particular size of rivet that will fit correctly within the drilled hole or a hole with countersink.

Sphere-based ring gage 700 uses spheres 708 and 710, which are easy to produce to an acceptable accuracy and eliminates reliance on ambiguous diameter at the theoretical contact point of the sharp-edged ring gage. As a result, the protrusion height of rivet height gage 706 may be reliably measured with the added benefit that the measurement is based on the height above reference spheres rather than a sharp-edged ring gage that may be suffering from roll-off. Spheres 708 and 710 are inexpensive and relatively easy to produce, as opposed to sharp-edged ring gages, which are more expensive and, even at best, do not provide a reliable reference edge over the long term.

Thus, the measured protrusion height is unambiguous because it is based on the deviation from the features of a sphere rather than a location on a sharp-edged ring, which may be dull or rounded rather than sharp. The calibration of rivet heights using sphere-based ring gages of this embodiment may be more precise and more accurately represents the condition of rivet holes that have been drilled into a work piece.

A spreadsheet with specified computations is utilized to determine the expected height "h" of the top of rivet height gage 706 above the plane established by the top of the set of spheres in sphere-based ring gage 700 in FIG. 7. In one embodiment, the plane may be established by placing an optical parallel on top of the spheres, locating the top with a linear transducer, and then pre-setting the transducer to its measured thickness. In another embodiment, the plane may be established directly on top of the spheres when the linear transducer is mated with an appropriate tip for sphere measurement.

In this example, the set of spheres sit on top of insert 704. In another embodiment, insert 704 is not used in sphere-based calibration gage. Instead, the set of spheres sit in contact with the shank of sphere-based calibration gage 700. Rivet height gage 706 is calibrated using sphere-based calibration gage 700 in an absence of insert 704.

Figure 8:
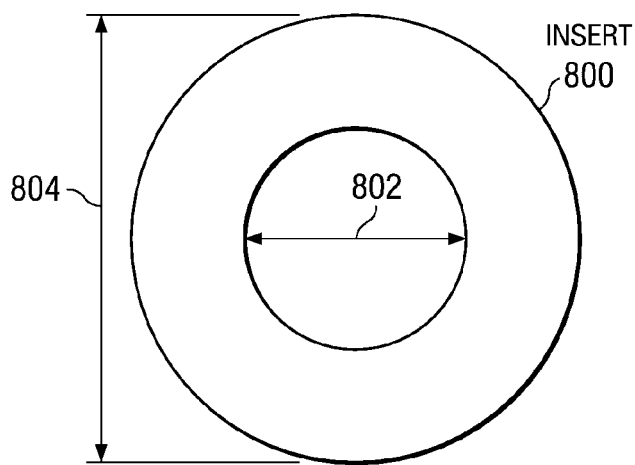
FIG. 8 is an illustration of an insert for a sphere-based gage for calibrating rivet height gages in accordance with an advantageous embodiment.

Turning now to FIG. 8, an illustration of an insert for a sphere-based gage for calibrating rivet height gages is shown in accordance with an advantageous embodiment. Insert 800 is a sleeve inside a sphere-based ring gage, such as sphere-based ring gage 700 in FIG. 7.

Insert 800 has an inside diameter 802 and an outside diameter 804. Insert 800 is fitted inside a ring gage with a contact force characterized as a slip fit. In this example, one surface of a plain, cylindrical ring gage is ground down to form a sharp edge on the hole of the ring gage. While this step is not absolutely required, forming the sharp edge on the hole of the ring gage reduces the roll-off and gives added assurance the spheres do not contact a rolled edged. The ring gage is fitted for insert 800 with a height such that the top surface of insert 800 is recessed below the top surface of the sphere-based ring gage. The set of spheres sit on top of insert 800 protrude above the reference surface. For example, insert 800 may be recessed 0.065 inches below the sharp edge surface, with a deviation of plus or minus 0.0005 inches if spheres of diameter 0.070 inch are used.

The outside diameter of insert 800 is sized to fit within the hole of the ring gage. For example, if the hole in the ring of the sphere-based ring gage is 0.1325 inches, outside diameter of insert 804 is an outside diameter that allows insert 800 to slip fit into the 0.1325 inch ring gage hole.

Inner diameter 802 forms a hole through the center of insert 800. A rivet height gage in contact with a set of spheres sitting on top of insert 800 protrudes down into the hole formed by inner diameter 802. In this example, inner diameter 802 is approximately 0.1562 with a deviation of plus 0.0005 or minus 0.002 inches. These measurements are provided only as examples and are not intended as limitations on the possible sizes and dimensions of insert 800 and/or a sphere-based ring gage.

All the measurements provided in FIG. 8 are only provided for purposes of illustration and not for purposes of limitation. The embodiments are not limited to utilization of inserts and/or sharp-edged ring gages having the measurements provided in this example. The measurements for the insert may be varied as needed to accommodate the requirements of ring gages of various sizes and/or various dimensions.

In one embodiment, program code calculate a size of the spheres in the set of spheres that is required to simulate a contact point of the specified sharp-edged ring gage, or the nearest practicable sphere size. The program code determines where the top of the gage should be in relation to the selected sphere. In other words, the program code calculates an "expected protrusion height" of the rivet height gage above the reference surface of the sphere-based ring gage.

Figure 9:
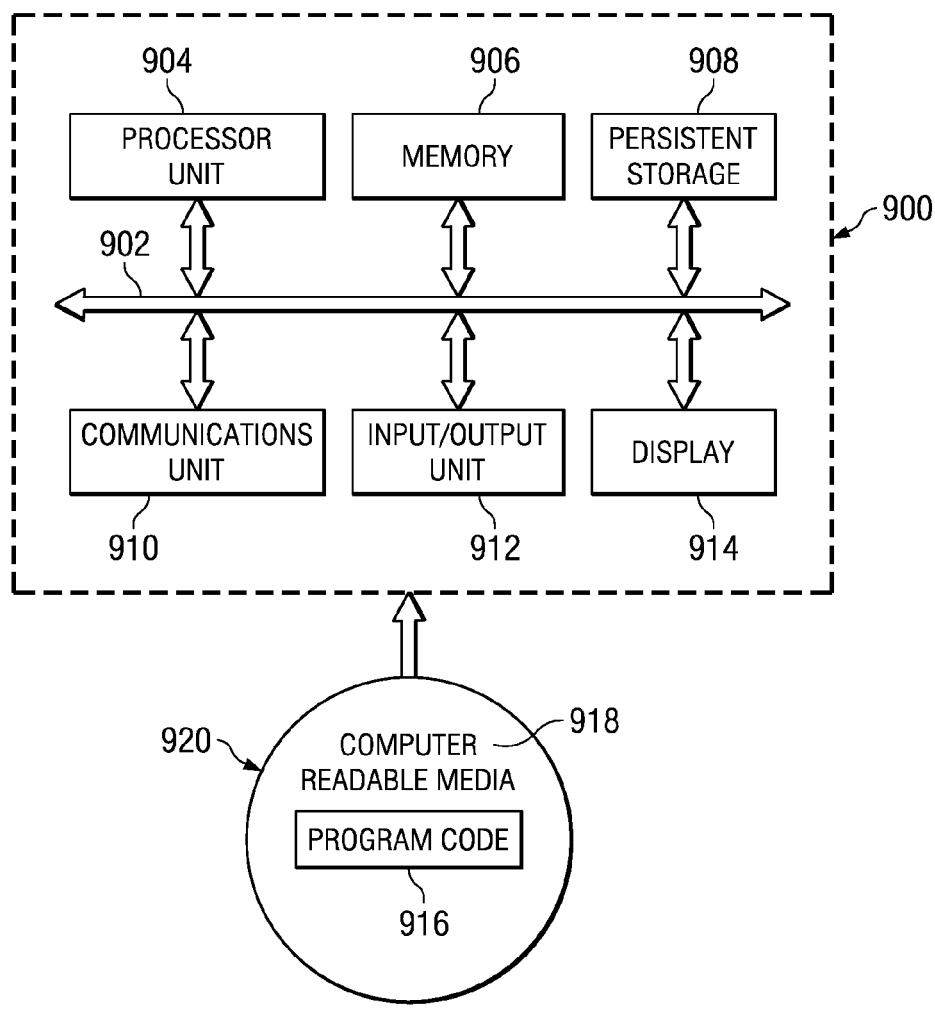
FIG. 9 is an illustration of a data processing system in which advantageous embodiments may be implemented.

With reference now to FIG. 9, a block diagram of a data processing system is shown in which illustrative embodiments may be implemented. Data processing system 900 may be implemented in any type of known or available computing device. Data processing system 900 calculates the expected protrusion height "h" from the top of a sphere-based rivet gage in relation to a set of spheres using nominal values for the rivet height gage being calibrated, a gage diameter of the sphere-based gage, and a diameter of the spheres. The illustrative embodiments utilize the expected height to calibrate rivet height gages, such as, without limitation, the FZDG rivet height gages, FRDG rivet height gages manufactured by Allfast Inc., or any other suitable types of rivet height gages.

In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a set of one or more processors or may be a multiprocessor core, depending on the particular implementation. Further, processor unit 904 may be implemented using one or more heterogeneous processor systems in which a main processor is present with secondary processors on a single chip. As another illustrative example, processor unit 904 may be a symmetric multi-processor system containing multiple processors of the same type.

Memory 906, in these examples, may be, for example, a random access memory or any other suitable volatile or non-volatile storage device. Persistent storage 908 may take various forms depending on the particular implementation. For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard and mouse. Further, input/output unit 912 may send output to a printer. Display 914 provides a mechanism to display information to a user.

Instructions for the operating system and applications or programs are located on persistent storage 908. These instructions may be loaded into memory 906 for execution by processor unit 904. The processes of the different embodiments may be performed by processor unit 904 using computer implemented instructions, which may be located in a memory, such as memory 906. These instructions are referred to as program code, computer usable program code, or computer readable program code that may be read and executed by a processor in processor unit 904. The program code in the different embodiments may be embodied on different physical or tangible computer readable media, such as memory 906 or persistent storage 908.

Program code 916 is located in a functional form on computer readable media 918 and may be loaded onto or transferred to data processing system 900 for execution by processor unit 904. Program code 916 and computer readable media 918 form computer program product 920 in these examples. In one example, computer readable media 918 may be in a tangible form, such as, for example, an optical or magnetic disc that is inserted or placed into a drive or other device that is part of persistent storage 908 for transfer onto a storage device, such as a hard drive that is part of persistent storage 908. In a tangible form, computer readable media 918 also may take the form of a persistent storage, such as a hard drive or a flash memory that is connected to data processing system 900. The tangible form of computer readable media 918 is also referred to as computer recordable storage media.

Alternatively, program code 916 may be transferred to data processing system 900 from computer readable media 918 through a communications link to communications unit 910 and/or through a connection to input/output unit 912. The communications link and/or the connection may be physical or wireless in the illustrative examples. The computer readable media also may take the form of non-tangible media, such as communications links or wireless transmissions containing the program code.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown.

As one example, a storage device in data processing system 900 is any hardware apparatus that may store data. Memory 906, persistent storage 908, and computer readable media 918 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906 or a cache such as found in an interface and memory controller hub that may be present in communications fabric 902.

The actual protrusion height of a rivet height gage is measured using a sphere-based ring gage, such as sphere-based ring gage 700 in FIG. 7. If the actual protrusion height is within an acceptable range of an expected protrusion height, the rivet height gage is accurately measuring rivet height within the specified tolerances.

Figure 10:
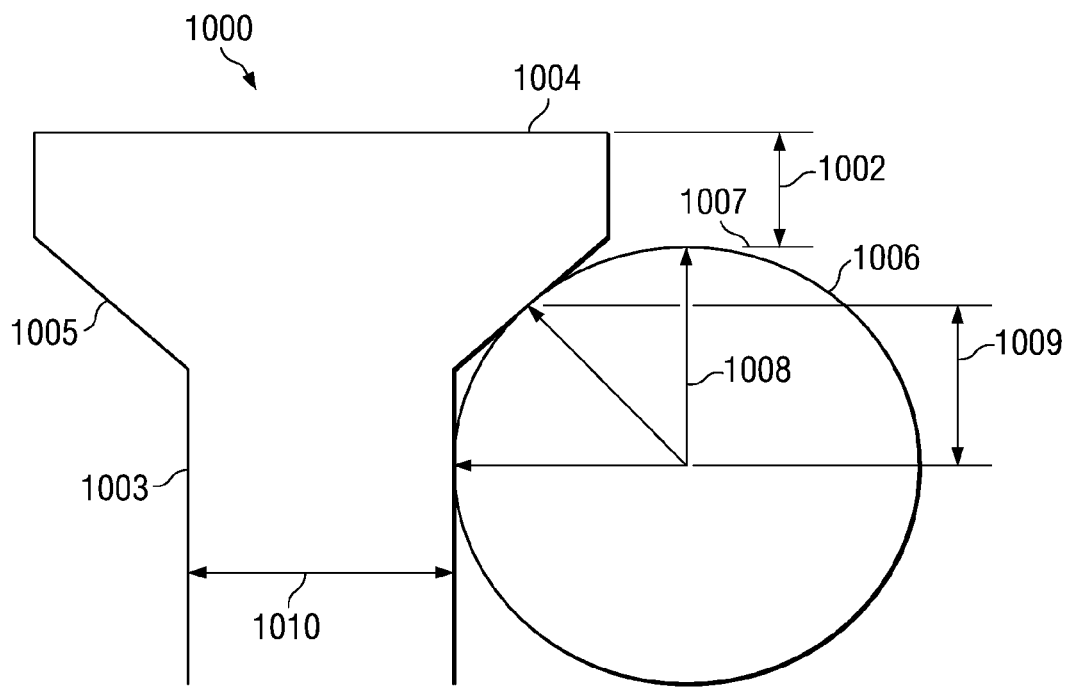
FIG. 10 is an illustration of reference data associated with a rivet height gage and a sphere utilized during a calibration procedure in accordance with an advantageous embodiment.

FIG. 10 is an illustration of reference data associated with a rivet height gage and a sphere utilized during a calibration procedure in accordance with an advantageous embodiment. Reference data 1000 includes data provided by a manufacturer of rivets and rivet height gages, as well as data calculated by a computing device, such as data processing system 900 in FIG. 9. Reference data 1000 is used to calculate expected protrusion height 1002 of rivet height gage 1004 in a sphere-based ring gage, such as sphere-based ring gage 500 in FIG. 5 or sphere-based ring gage 700 in FIG. 7.

Expected protrusion height 1002 is the expected height of the rivet height gage above the set of reference spheres, such as reference sphere 1006. Expected protrusion height 1002 is contingent on shank 1003 and conical surface 1005 of rivet height gage 1004 being placed in contact with a set of spheres of specified size, such as, without limitation, sphere 1006. Reference surface 1007 is established by the tops of the set of spheres, such as set of spheres 516 in FIG. 5.

The process identifies a ring diameter and sphere radius 1008 to accommodate shank 1003 of rivet height gage 1004. The diameter or radius 1008 of the spheres in the set of spheres is a size that is sufficient to simulate the contact point "c" 1009 of the specified sharp-edged ring gage, or the nearest practicable sphere size. The sphere size may also be referred to as a sphere diameter or a sphere radius. The process then determines where the top of rivet height gage should be in relation to the selected set of spheres. Shank diameter 1010 is provided by the manufacturer of rivet height gage 1004.

Figure 11:
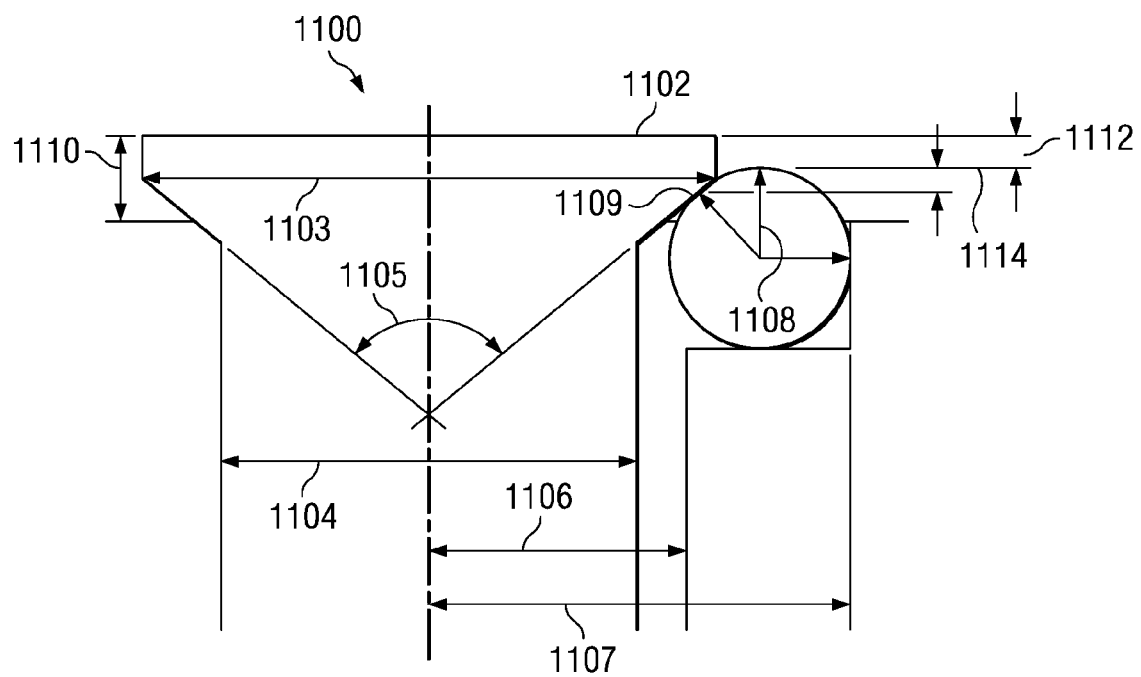
FIG. 11 is an illustration of reference data associated with a sphere-based gage for calibrating rivet height gages in accordance with an advantageous embodiment.

FIG. 11 is an illustration of reference data associated with a sphere-based ring gage for calibrating rivet height gages in accordance with an advantageous embodiment. Reference data 1100 is a spreadsheet of measurements for use in calculating an expected protrusion height of a rivet height gage in a particular sphere-based ring gage.

Rivet height gage representation 1102 is a representation of a rivet height gage sitting inside a sphere-based ring gage. In this example, the rivet height gage has head diameter 1103 of 0.50037, shank diameter 1104 of 0.34843, and apex angle 1105 of 120.1 degrees. This information is typically provided by a manufacturer of the rivet height gage.

Insert radius 1106 is an inside radius of an insert of the sphere-based ring gage forming a hole. The rivet height gage fits inside the hole formed by inside radius 1106. Ring gage radius 1107 is an inside radius defining a hole in the sphere-based ring gage. The insert fits inside the hole defined by ring gage radius 1107 and the rivet height gage shank diameter fits inside the insert diameter 1106.

Sphere radius 1108 is a size of the spheres in the set of spheres that is sufficient to simulate a contact point between the top of the rivet height gage and a sharp-edge of a ring gage. The rivet height gage contacts the spheres in the set of spheres at contact point 1109. Reference surface 1114 is established by the tops of the spheres.

Height 1110 0.05000 is a protrusion height of a rivet height gage above reference surface 1114 of a sharp-edged ring gage that is provided by a manufacturer of the rivet height gage. However, because this embodiment utilizes a set of spheres, such as set of spheres 516 in FIG. 6, rather than a sharp edge, the process calculates expected protrusion height 1112 of the rivet height gage for the sphere-based ring gage using ring gage radius 1107 or ring gage diameter, sphere radius 1108 or a diameter of the spheres, and other nominal values for the rivet height gage being calibrated, such as, without limitation, one or more of the data shown in reference data 1100.

Reference data 1100 provides exemplary measurements and types of data used to calibrate a rivet height gage. The measurements are not intended to be limitations on the embodiments. A rivet height gage and a sphere-based ring gage in accordance with the illustrative embodiments may include diameters, angles, and other measurements that differ from those shown in FIG. 1100.

Figure 12:
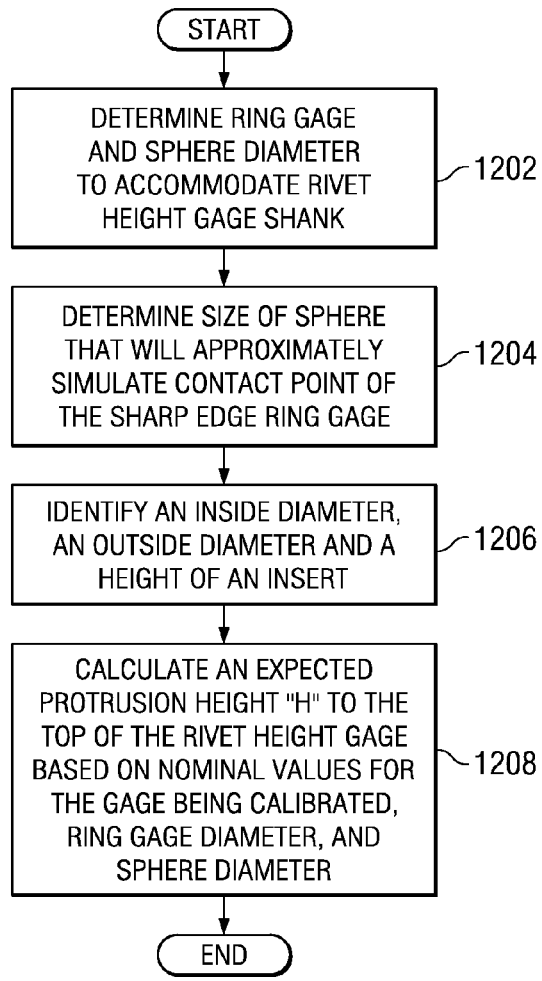
FIG. 12 is a flowchart illustrating a process for calculating reference data for utilization during a calibration procedure in accordance with an advantageous embodiment.

FIG. 12 is a flowchart illustrating a process for calculating reference data for utilization during a calibration procedure in accordance with an advantageous embodiment. The process in FIG. 12 is implemented by a computing device, such as data processing system 900 in FIG. 9. The process may also be implemented in whole or in part manually by a human user.

The process begins by determining a ring gage diameter and sphere diameter that is sufficient to accommodate an insert which in turn accommodates a shank of a rivet height gage that is to be calibrated (operation 1202). In the alternative, a radius of the ring gage and a radius of sphere may be calculated instead of or in addition to determining diameters. The insert is an insert such as, without limitation, the insert shown in FIG. 8.

The process determines a size of sphere required to approximately simulate a contact point of the rivet height gage with a sharp edge of a sharp edged ring gage (operation 1204), such as contact point 1109 in FIG. 11. Determining a size of sphere required optionally includes verifying that the selected size of sphere will approximately simulate the contact point of the sharp edged ring gage.

The process identifies an inside diameter, an outside diameter, and a height of an insert (operation 1206) that is sufficient to permit the insert to slip fit into a hole defined by the diameter of the ring gage and permit the shank of the rivet height gage to fit within a hole defined by the inside diameter of the insert. The process calculates an expected protrusion height "h" to the top of the rivet height gage based on nominal values for the rivet height gage being calibrated, the ring gage diameter, and the sphere diameter for the set of spheres (operation 1208) with the process terminating thereafter. The protrusion height may be a positive protrusion height or a negative protrusion height. The ring gage diameter, sphere size/diameter, insert measurements, and expected protrusion height are used to assemble a sphere-based ring gage and calibrate the rivet height gage.

In another embodiment, a ring gage diameter sufficient to accommodate the rivet height gage shank is determined instead of determining a diameter of the ring gage to accommodate an insert that accommodates the rivet height gage shank. In this embodiment, the sphere-based ring gage is used to calibrate the rivet height gage without an insert.

Figure 13:
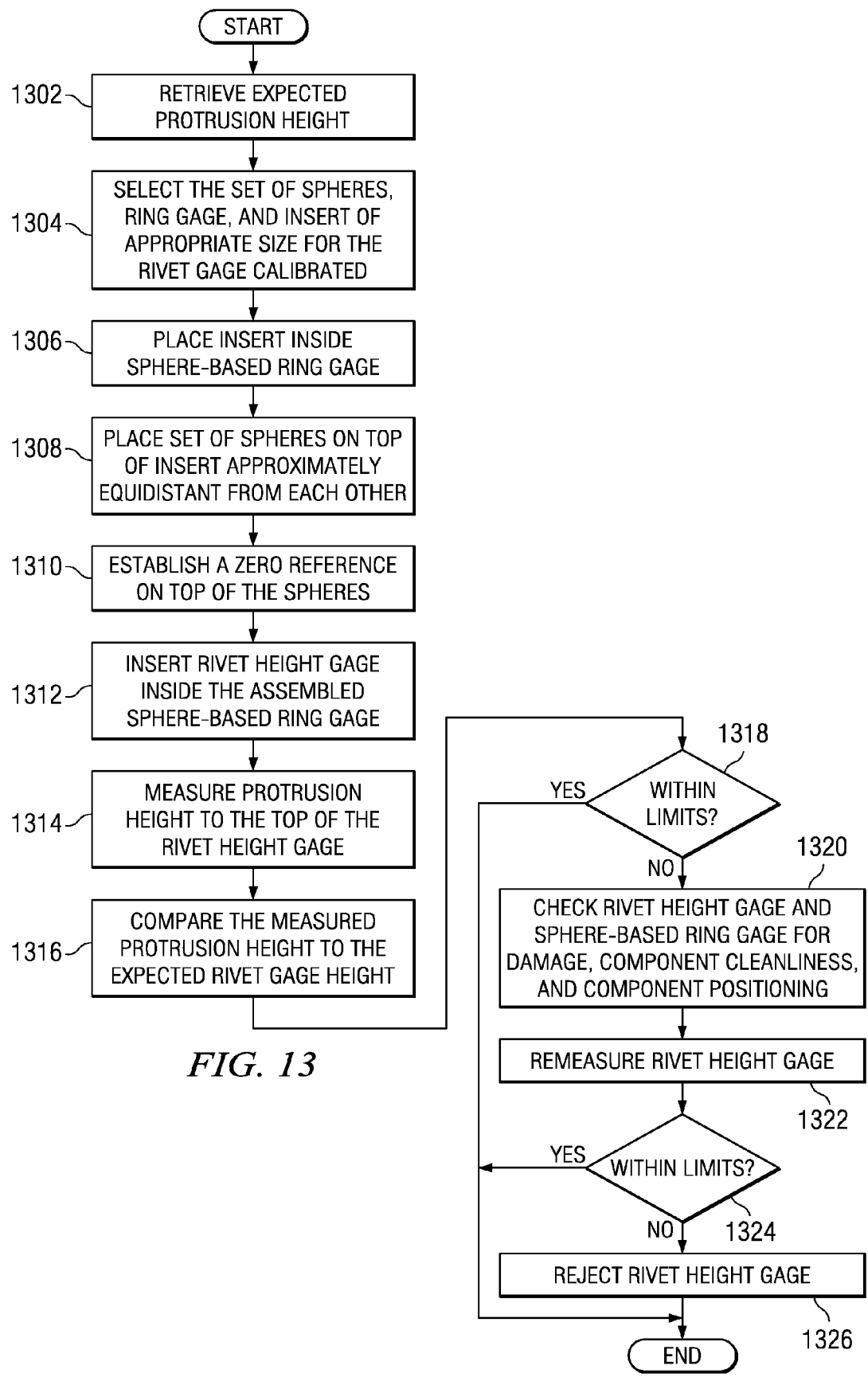
FIG. 13 is a flowchart illustrating a process for calibrating a rivet height gage using a sphere-based ring gage in accordance with an advantageous embodiment.

FIG. 13 is a flowchart illustrating a process for calibrating a rivet height gage using a sphere-based gage in accordance with an illustrative embodiment. The process in FIG. 13 is implemented manually by a human user. The process may also be implemented by an automated process using robotic arms and automated tools.

An expected protrusion height for a rivet height gage is retrieved (operation 1302). A set of spheres, ring gage, and insert of appropriate size for the ring gage to be calibrated is selected (operation 1304). The size is a radius or diameter of the spheres. An insert of appropriate size is placed inside the sphere-based ring gage (operation 1306). The set of spheres are placed on top of the insert approximately equidistant from each other (operation 1308). A zero reference is established on top of the spheres (operation 1310).

The rivet height gage is inserted inside the assembled sphere-based ring gage (operation 1312). An actual protrusion height from the reference surface to the top of the rivet height gage is measured (operation 1314). The measured protrusion height is compared to the expected protrusion height (operation 1316). A determination is made as to whether the actual measured protrusion height is within tolerance limits for the rivet (operation 1318). If the measured protrusion height is within limits, the process terminates thereafter.

Returning to operation 1318, if the measured protrusion height is not within limits, the rivet height gage and sphere-based ring gage components are checked for damage, component positioning, and cleanliness (operation 1320). In this operation, other indicators of problems with the rivet height gage and the sphere-based ring gage may also be checked. For example, and without limitation, the rivet height gage and sphere-based ring gage may also be checked for imperfections in components of the rivet height gage and/or the sphere-based ring gage, misalignment of components, incorrect size of components, or any other indicators of incorrect assembly of the sphere-based ring gage and/or rivet height gage. Thus, the cleanliness, location of components, and lack of damage to the rivet height gage and the sphere-based ring gage is verified.

The rivet height gage is then re-measured (operation 1322). Re-measuring may also be referred to as calibrating. A second tolerance determination is performed to determine if the actual measured protrusion height is within tolerance limits (operation 1324). If the measured protrusion height is within tolerance, the process terminates thereafter. If the measured protrusion height is still not within tolerance limits at operation 1324, the rivet height gage is rejected (operation 1326), with the process terminating thereafter.

Thus, the illustrative embodiments provide a method, apparatus, and computer usable program code for a sphere-based ring gage. In one embodiment, the process calculates a size of sphere required to simulate a contact point between a rivet height gage and a sharp edge of a specified sharp-edged ring gage. The process identifies an expected protrusion height from a top of the rivet height gage to a reference surface formed by tops of a set of spheres of the size of sphere required to simulate the contact point.

The embodiments establish a new method for calibrating rivet height gages. The embodiments provide test equipment, analysis, and computation method required to calibrate rivet height gages. The embodiments utilize spheres, which are easy to produce to an acceptable accuracy and which eliminates reliance on the ambiguous diameter at the theoretical contact point of the sharp-edged ring gage. In addition, the spheres are an improvement because they are inexpensive and relatively easy to produce, as opposed to a sharp-edged ring gage, which is more expensive to produce and, even at its best, does not provide a reliable reference edge over the long term. As a result, the protrusion height can be reliably measured with the added benefit that the measurement is based on the height above reference spheres rather than a sharp-edged ring gage.

In other words, the protrusion height measured using a sphere-based ring gage of the illustrative embodiments is unambiguous because it is based on the deviation from the features of a sphere, which is unambiguous, rather than a location on a sharp-edged ring, which is ambiguous. Moreover, the calibration of the rivet height gage may be more precise and repeatable to the "go/no-go" decisions made on the manufacturing floor are based on a gage that more accurately represents the condition of the rivet holes that have been drilled.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for measuring protrusion heights of rivet height gages, the method comprising:
   calculating, by a processor, a size of sphere required to create a sphere-based ring gage to replace a contact point between a rivet height gage and a sharp edge of a specified sharp-edged ring gage, wherein the sphere is between the sharp-edged ring gage and the rivet height gage; and
   calculating, by the processor, an expected protrusion height from a top of the rivet height gage to a reference surface formed by tops of a set of spheres of the size of sphere required to replace the contact point.

2. The method of claim 1 further comprising:
   identifying an outside diameter of an insert, wherein the outside diameter of the insert fits inside the sphere-based ring gage.

3. The method of claim 2 further comprising:
   inserting the insert inside the sphere-based ring gage, wherein the set of spheres sits on top of the insert, and wherein the tops of the spheres protrude above a height of the sphere-based ring gage.

4. The method of claim 1 further comprising:
   identifying a height of an insert, wherein the height of the insert is less than a height of the sphere-based ring gage, wherein the set of spheres sits on top of the insert, and wherein the tops of the spheres protrude above the height of the sphere-based ring gage.

5. The method of claim 1 further comprising:
   identifying an inside diameter of the sphere-based ring gage, wherein the sphere-based ring gage is fully assembled, and wherein the inside diameter of the sphere-based ring gage is sufficient to permit a shank of the rivet height gage to fit inside a hole defined by the inside diameter of the sphere-based ring gage.

6. The method of claim 5 further comprising:
   measuring an actual protrusion height from the top of the rivet gage to the reference surface.

7. The method of claim 1 further comprising:
placing the set of spheres approximately an equal distance apart; and
establishing a zero reference on top of the set of spheres to form the reference surface.

8. The method of claim 1 further comprising:
comparing the expected protrusion height to an actual protrusion height to determine if the rivet height gage is within tolerance.

9. A method for measuring protrusion heights of rivet height gages, the method comprising:
calculating, by a processor, a size of sphere required to create a sphere-based ring gage to replace a contact point between a rivet height gage and a sharp edge of a specified sharp-edged ring gage, wherein the sphere is between the sharp-edged ring gage and the rivet height gage;
calculating, by the processor, an expected protrusion height from a top of the rivet height gage to a reference surface formed by tops of a set of spheres of the size of sphere required to replace the contact point; and
identifying an inside diameter of an insert, wherein a shank of the rivet height gage fits inside a hole defined by the inside diameter.

10. A computer program product for measuring protrusion heights of rivet gages, the computer program product comprising:
a non-transitory computer readable medium;
program code stored on the non-transitory computer readable medium for calculating a size of sphere required to create a sphere-based ring gage to replace a contact point between a rivet height gage and a sharp edge of a specified sharp-edged ring gage, wherein the sphere is between the sharp-edged ring gage and the rivet height gage; and
program code stored on the computer readable medium for identifying an expected protrusion height from a top of the rivet height gage to a reference surface formed by tops of a set of spheres of the size of sphere required to replace the contact point.

11. The computer program product of claim 10 further comprising:
program code stored on the non-transitory computer readable medium for identifying an inside diameter of the sphere-based ring gage, wherein the sphere-based ring gage is fully assembled, and wherein the inside diameter of the sphere-based ring gage is sufficient to permit a shank of the rivet height gage to fit inside a hole defined by the inside diameter of the sphere-based ring gage.

12. The computer program product of claim 10 further comprising:
program code stored on the non-transitory computer readable medium for identifying a height of an insert, wherein the height of the insert is less than a height of the sphere-based ring gage, wherein the set of spheres sits on top of the insert, and wherein the tops of the spheres protrude above the height of the sphere-based ring gage.

13. The computer program product of claim 10 further comprising:
program code stored on the non-transitory computer readable medium for comparing an actual protrusion height to the expected protrusion height to determine if the rivet height gage is within tolerance, wherein the actual protrusion height is a height from the top of the rivet height gage to the reference surface.

14. A computer program product for measuring protrusion heights of rivet gages, the computer program product comprising:
a non-transitory computer readable medium;
program code stored on the non-transitory computer readable medium for calculating a size of sphere required to create a sphere-based ring gage to replace a contact point between a rivet height gage and a sharp edge of a specified sharp-edged ring gage, wherein the sphere is between the sharp-edged ring gage and the rivet height gage;
program code stored on the non-transitory computer readable medium for identifying an expected protrusion height from a top of the rivet height gage to a reference surface formed by tops of a set of spheres of the size of sphere required to replace the contact point;
program code stored on the non-transitory computer readable medium for identifying an inside diameter of an insert, wherein a shank of the rivet height gage fits inside a hole defined by the inside diameter; and
program code stored on the non-transitory computer readable medium for identifying an outside diameter of the insert, wherein the outside diameter of the insert fits inside the sphere-based ring gage.

15. A sphere-based ring gage comprising:
a ring gage having an inside diameter, wherein the inside diameter defines a hole that is large enough for a shank of a rivet height gage to fit inside the hole; and
a set of spheres, wherein a top of the set of spheres forms a reference surface, and wherein each sphere in the set of spheres is a size that replaces a contact point between the rivet height gage and a sharp edge of the ring gage,
wherein the sphere is between the sharp-edged ring gage and the rivet height gage.

16. The sphere-based ring gage of claim 15 further comprising:
an insert, wherein the insert comprises:
an inside diameter, wherein a shank of the rivet height gage fits inside a hole defined by the inside diameter;
an outside diameter, wherein the outside diameter of the insert fits inside the ring gage; and
a height of the insert, wherein the height of the insert is less than a height of the ring gage.

17. The sphere-based ring gage of claim 16 further comprising:
the rivet height gage, wherein the rivet height gage fits inside the hole defined by the inside diameter of the insert, and wherein a top of the rivet height gage protrudes above the reference surface to form an actual protrusion height, and wherein the actual protrusion height is compared to an expected protrusion height from the top of the rivet height gage to a reference surface formed by the top of the set of spheres to determine if the rivet height gage is within tolerance.

18. The sphere-based ring gage of claim 15 further comprising:
a data processing system, wherein the data processing system
calculates the size of sphere required to replace the contact point between the rivet height gage and the sharp edge of the specified sharp-edged ring gage;
identifies an expected protrusion height from a top of the rivet height gage to a reference surface formed by tops of the set of spheres of the size of sphere required to replace the contact point; and
compares an actual protrusion height from the top of the rivet height gage to the reference surface to the expected protrusion height to determine if the rivet height gage is within tolerance.

19. A sphere-based ring gage comprising:

a ring gage having an inside diameter, wherein the inside diameter defines a hole that is large enough for a shank of a rivet height gage to fit inside the hole; and a set of spheres, wherein a top of the set of spheres forms a reference surface, and wherein each sphere in the set of spheres is a size that replaces a contact point between the rivet height gage and a sharp edge of the ring gage, wherein the sphere is between the sharp-edged ring gage and the rivet height gage, and wherein the set of spheres comprises three spheres, wherein each sphere in the set of three spheres has a same diameter.

* * * * *